United States Patent [19]

Olszewski

[11] 4,341,032
[45] Jul. 27, 1982

[54] FISHING LURE WITH INHERENT ORIENTING BALLAST

[75] Inventor: Daniel P. Olszewski, Indialantic, Fla.
[73] Assignee: Ego Lures Company, Melbourne, Fla.
[21] Appl. No.: 142,870
[22] Filed: Apr. 24, 1980
[51] Int. Cl.³ .............................................. A01K 85/00
[52] U.S. Cl. .................................................. 43/42.45
[58] Field of Search ................. 43/42.45, 42.47, 42.48, 43/42.39

[56] References Cited

U.S. PATENT DOCUMENTS

| | | | |
|---|---|---|---|
| 1,663,080 | 3/1928 | Heddon | 43/42.48 |
| 2,644,265 | 7/1953 | Stettner | 43/42.39 |
| 3,702,035 | 11/1972 | Pope | 43/42.47 |
| 3,979,853 | 9/1976 | Storm et al. | 43/42.39 |
| 4,098,017 | 7/1978 | Hall | 43/42.39 |

*Primary Examiner*—James L. Jones, Jr.
*Attorney, Agent, or Firm*—Harold Gell

[57] ABSTRACT

Herein is a fishing lure fabricated from a material having a density greater than water and geometrically configured so that the lure will have a tendency to maintain an upright orientation in water. In addition, the lure includes a diving plane and boundary layer inducing curves incorporated into the basic lure structure whereby predetermined lure motions are generated as a function of the reaction of the diving plane and shifting surface drag pattern to the water as the lure is retrieved.

7 Claims, 5 Drawing Figures

FISHING LURE WITH INHERENT ORIENTING BALLAST

TECHNICAL FIELD

This invention relates to fishing lures which are constructed from a material having a density greater than the water medium through which the lure is to be operated and including an overall geometry which will provide an inherent ballast which causes the lure to maintain a proper orientation in the water that will cause diving plane surfaces incorporated in the lure to impart predetermined actions to the lure as it is retrieved.

BACKGROUND OF PRIOR ART

Prior art fishing lures have generally neglected ballast considerations to maintain a lure in proper orientation so that desired lure action is generated while the lure is retrieved. A majority of prior art lures rely upon diving planes which, with the aid of forces exerted on the lure by the retrieving line cause the lure to exhibit a predetermined motion and orientation. However, the situation frequently occurs wherein a bit of seaweed or a twisted leader cause the lure to lie in the water in an unnatural attitude at the beginning of retrieve and as a result the lure will not provide the desired action in that it will dart in the wrong and, generally unnatural, direction.

In other prior art lures, the position of the leader attachment means is selected so that the lure will assume a proper orientation as it is retrieved. However, as in the diving plane type of lure discussed above, a twisted leader or a fouled hook will cause the lure to assume an unnatural attitude during the retrieve and the lure will not simulate a bait as desired.

A still further approach to maintaining a fishing lure in proper orientation during retrieval is the use of hooks to ballast the lure. This approach is prone to the same failures as previously discussed with respect to fouled leaders and hooks. Furthermore, hooks are prone to snag seaweed and similar plant life and if the object snagged by a hook is buoyant, the ballast effects of the hooks is destroyed and the lure cannot be retrieved in a manner which will simulate the desired bait.

OBJECTIVES OF THE INVENTION

Therefore, it is a primary objective of the present invention to provide a fishing lure which combines an inherent ballast for a fishing lure created as a function of the density of the material from which the lure body is formed and the lure body geometry.

A further objective of the invention is to provide a fishing lure which includes reaction surfaces incorporated into the lure body which, in combination with the lure center of gravity location cause the lure to exhibit predetermined bait fish simulating actions during retrieval.

A further objective of the invention is to provide an artificial bait having a lure body section significantly wider than the upper body section wherein the lure body section includes a bulbous outer configuration calculated to provide a minimal amount of resistance as the lure is retrieved through the water and the upper body section includes planar surfaces which resist motion of the lure through the water and thus impart predetermined, bait fish simulating motions.

The foregoing, and other objectives of the present invention will become apparent in light of the specification, drawings and claims which form a part of this patent.

SUMMARY OF THE INVENTION

This invention presents a fishing lure fabricated from a material having a density greater than the liquid medium through which the lure is intended to be retrieved and incorporating an external geometry which results in the location of the center of gravity of the lure such that the lure will maintain a predetermined orientation when suspended in a liquid medium. The lure body has a section calculated to offer minimal resistance to the water as the lure is retrieved and a further body surface calculated to present predetermined resistances to the water as the lure is retrieved at varying speeds. These predetermined resistances are calculated to cause motions to be imparted to the lure which deviate from the normal path of travel through the water. These motions are calculated to simulate the darting and diving actions of a bait fish.

DESCRIPTION OF THE INVENTION

Disclosed herein is a typical embodiment of the inventive concepts presented by this patent which are applicable to a wide range of fishing lures. In view of the breadth of the possible applications of the inventive concepts, a single, typical fishing lure will be discussed herein to provide an indication of the principles embodied in the invention and to further provide a means whereby the benefits of the invention may be realized through the manufacture of a variety of fishing lures. Typically, the lure may incorporate the various features described in the co-pending patent applications, Ser. No. 142,868 on "Fishing Lure And Method Of Fabrication" and Ser. No. 142,868 on "Fishing Lure With Flashing Light Illusion" both filed by the same inventor as the present application. Lures utilizing the principles defined herein may also be fabricated utilizing the methods disclosed by the above referenced patent applications.

Figure 1:
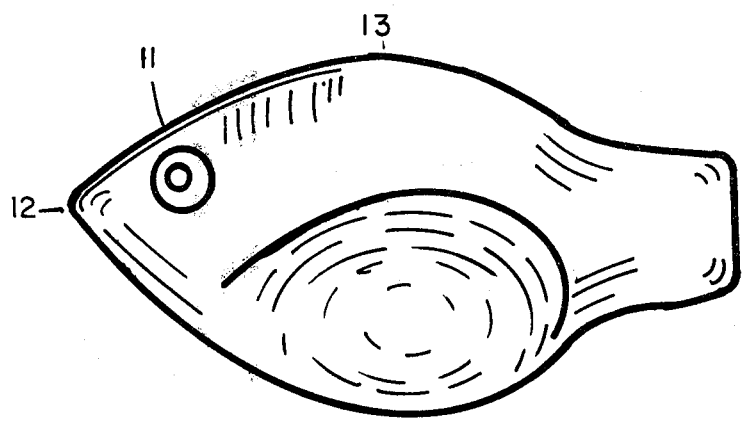
FIG. 1 is a side view of a preferred embodiment of the fishing lure described and defined herein.

FIG. 1 is a side view of a typical fishing lure incorporating the inventive concepts presented hereby. A diving plane surface 11 is created across the upper, forward section of the fishing lure. This surface extends from the most forward portion, 12, of the lure body to the upper most portion 13 and extends a distance of forty two percent of the length of the bait.

Figure 2:
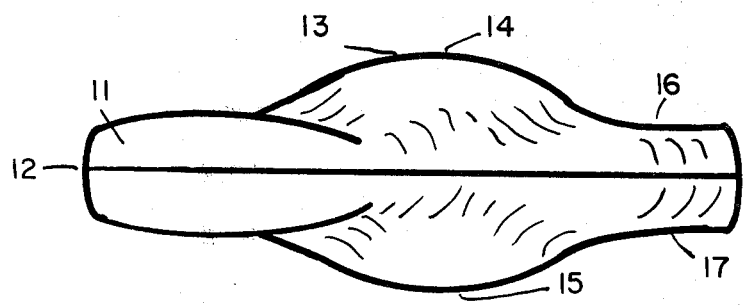
FIG. 2 is a top view of the fishing lure illustrating various cross-sectional areas.

Note in FIG. 2 that the flattened portion 11 is relatively narrow at points 12 and 13. This permits a relatively smooth flow of water to pass the action generating surface 11 as the lure is retrieved. This relatively unturbulent flow passes over the bulbous center portion of the lower section of the lure body identified in FIGS. 2 through 5 as that portion of the body between points 14 and 15 and enhances the boundary layer effects which contribute to the lures action.

Figure 4:
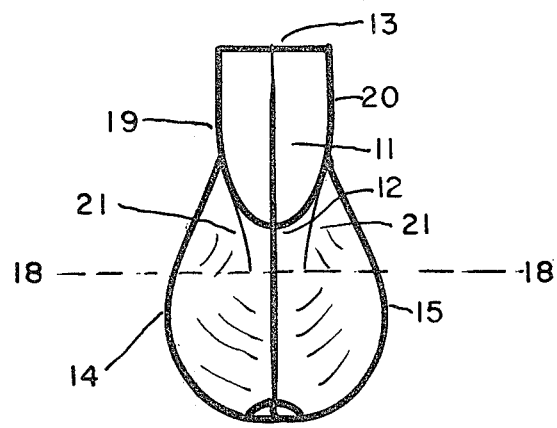
FIG. 4 is a front view of the fishing lure illustrating the relation of the cross-sectional areas illustrated in FIGS. 2 and 3 and further illustrating the diving plane surfaces of the lure.
Figure 5:
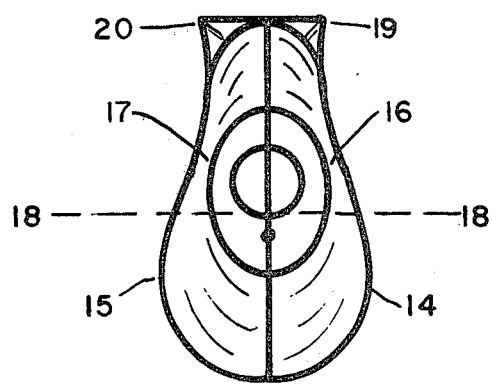
FIG. 5 is a rear view of the lure further illustrating the cross-sectional areas depicted in FIGS. 2, 3, and 4 and their relationship to the overall geometry of the lure.

In FIGS. 4 and 5 note that the width of the fishing lure is much greater below the median of the lure and therefore the center of gravity is located at a point below the midline 18 of the body. Note also that this places the center of gravity of the body below the beginning point 12 of the diving plane 11 so that as the lure assumes a nose down attitude during retrieve, the center of gravity will still remain below the effective midline of the body.

Figure 3:
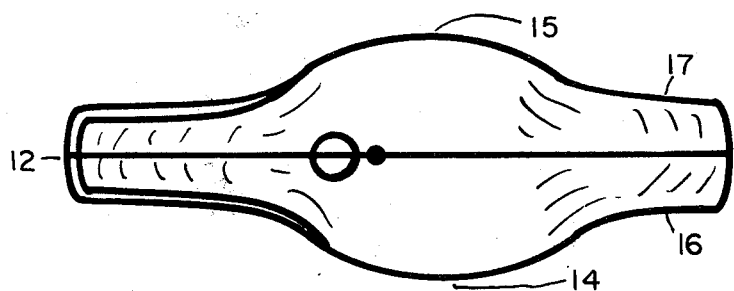
FIG. 3 is a bottom view of the fishing lure further illustrating the variation in cross-sectional areas.

In FIGS. 2 and 3 the bulbous portion of the lure body extends approximately sixty percent of the total body length commencing from a point eight percent of the total length from the forward most portion 12 with the remaining thirty-two percent of body length including a narrow waste section between points 16 and 17 which creates a high-drag boundary layer effect in the surface flow pattern of liquid over the rear of the lure. This tends to increase resistance of the lure as it travels through the water. The increased resistance in the rear most portion of the lure as it is retrieved tends to stabilize the lure and prevent erratic motions other than those desired and created by the diving plane 11.

A further feature of the lure shape which adds to its stable action is created by the boundary layer effect in surface flow generated as the result of the curvature between the outer edges 19 and 20 of the diving plane 11 and the bulbous lower body parts at points 14 and 15. This curvature, which may best be seen in FIGS. 4 and 5, varies the drag created by water flow over the lure body and creates a stabilizing effect that cooperates with the stabilizing effect of the boundary layer drag variations created in the rear section of the lure as previously described with respect to the narrowing points 16 and 17 of FIGS. 2 and 3. These stabilizing effects cause the lure to return to its optimum attitude for retrieval after each darting motion created by plane 11.

For instance, consider the lure at rest in water. Due to its inherent ballast it will assume a level attitude in the water similar to that illustrated in FIG. 1. As the retrieve begins, the boundary layer effect of surface drag along the rear portion of the lure is maximum and along the forward portion of the lure is minimum. This stabilizes the lure, but as the plane 11 overcomes that stability and initiates a darting effect, the angle at which the rear and front sections of the lure are traversing the water change and the drag effect diminishes at the rear but increases at the front. This causes the darting effect to vary intensity similar to the motion of a bait fish as it darts and the swimming functions of its body vary with respect to its tail stroke. As the darting action of the lure continues, the angle of attack of the lure increases to a point where water flow over the surface of the lure approaches a plane normal to the plane of surface 11. Thus the surface flow of the water over the lure is changed so the boundary layer effect in the tail section is minimal but the boundary layer effect of the surface flow over the curvature at point 21 near the forward end of the lure reaches its maximum. This increases resistance in the forward end of the lure and decreases resistance in the rear portion of the lure in a non-linear fashion which creates an oscillation of the lure that brings the lure out of the erratic dive generated at the beginning of the retrieve. When the lure has returned to its level attitude, the full cycle begins again and a second darting action commences.

It should be noted that through the total sequence of darting action exhibited by the lure, the effective center of gravity of the lure remains below the midline and diving plane so that the lure will not rotate and follow the leader or deviate from its intended and designed action.

In a preferred embodiment, the inventive concepts presented herein may be accomplished through the use of a lure comprised of an outer body shell fabricated from a clear plastic material such as suggested in the previously referenced applications on "Fishing Lure And Method Of Fabrication" and "Fishing Lure With Flashing Light Illusion". In this case, buoyancy may be controlled as a function of the center body core inserts utilized in the lure but the center of gravity of the lure and therefore the inherent ballast of the lure is determined by the outer body shell which has significantly greater volume than the inner core.

While a preferred embodiment of this invention has been illustrated and described, variations and modifications may be apparent to those skilled in the art. Therefore, I do not wish to be limited thereto and ask that the scope and breadth of this invention be determined from the claims which follow rather than the above description.

What I claim is:

1. A fishing lure, comprising a body, including:
    an upper section including a flat top surface starting at the nose of the lure and ending at the top of the back of the lure, the plane of said flat top surface creating an angle greater than 0° and less than 90° to the longitudinal axis of the body;
    a lower section including a front and a tail section of approximately the same average thickness as said upper section and a bulbous section positioned in the longitudinal center and lower half of the lure body, said bulbous section thicker in cross section than said upper section, said difference in thickness selected to cause the center of gravity of said body to be within said lower section; and
    a concaved surface configuration between the side edges of said flat top surface and said bulbous section dimensioned to create a boundary layer effect in the surface flow over said body which increases drag as the flow direction approaches the direction perpendicular to the plane of said flat top surface.

2. A fishing lure as defined in claim 1, further including concave side surfaces in the rear portion of said body behind said flat surface and said bulbous section for creating a boundary layer effect in the surface flow over said body which decreases drag as the direction of flow approaches a direction perpendicular to the plane of said flat surface.

3. A fishing lure as defined in claim 2, wherein said thicknesses are selected to cause the center of gravity to be within said lower section and below the forward most point of said flat surface when the surface flow over said body is normal to the plane of said flat surface.

4. A fishing lure as defined in claim 3 wherein said flattened surface commences at the most forward portion of said fishing lure and extends rearwardly to the highest point of said body.

5. A fishing lure as defined in claim 4 wherein said flattened surface extends a distance equal to forty percent of said body length.

6. A fishing lure as defined in claim 4 wherein said bulbous section includes sixty percent of the length of said lure.

7. A fishing lure as defined in claim 6 wherein said bulbous section begins at a point behind the forward most point of said body which is equal to eight percent of the total length of said body.

* * * * *